US008633786B2

(12) United States Patent
Ermolov et al.

(10) Patent No.: US 8,633,786 B2
(45) Date of Patent: Jan. 21, 2014

(54) APPARATUS AND ASSOCIATED METHODS

(75) Inventors: Vladimir Ermolov, Espoo (FI); Igor Nefedov, Espoo (FI)

(73) Assignee: Nokia Corporation, Espoo (FI)

( * ) Notice: Subject to any disclaimer, the term of this patent is extended or adjusted under 35 U.S.C. 154(b) by 493 days.

(21) Appl. No.: 12/890,942

(22) Filed: Sep. 27, 2010

(65) Prior Publication Data

US 2012/0075037 A1 Mar. 29, 2012

(51) Int. Cl.
*H01P 9/00* (2006.01)
(52) U.S. Cl.
USPC .............................. 333/157; 977/742; 977/932
(58) Field of Classification Search
USPC .................. 333/157, 248; 977/742, 932, 762
See application file for complete search history.

(56) References Cited

U.S. PATENT DOCUMENTS

| 7,157,990 B1 * | 1/2007 | Adam et al. ................. 333/186 |
| 2002/0167375 A1 | 11/2002 | Hoppe et al. |
| 2003/0042997 A1 * | 3/2003 | Baik et al. ..................... 333/156 |

FOREIGN PATENT DOCUMENTS

WO   WO 2009/068051 A1 *   6/2009   ............... H01P 9/00

OTHER PUBLICATIONS

Marcuse, "Theory of Dielectric Waveguides", equation (2.3-1), p. 78, Academic Press, 1974.*
Richard Osgood III, Gary Walsh, David Ziegler, Joel Carlson, Lauren Belton, Brian Kimball, "Nanoantennas with short-wavelength resonance", Plasmonics: Metallic Nanostructures and Thier Optical Properties VI, Proc. of SPIE vol. 7032, 70326, (2008).*
J.M. M Park and D.C. Park, "X-Band Ferrite Phase Shifter in Waveguide Geometry", IEEE TENCON '93 Proceedings, 1993, pp. 464-467.*
Figure from J. Li et al., Appl. Phys. Lett. 75, 367 (1999) American Institute of Physics.
Fitch, M., et al., "Terahertz Waves for Communications and Sensing.", John Hopkins Apl Technical Digest, vol. 25, No. 4 (2004).
Chen, M., et al. "Fully printed phased-array antenna for space communications.", ProC of SPIE vol. 7318 731814 .. 1, May 11, 2009.
http://en.wikipedia.org/wiki/Piezoelectricity#Actuators, Mar. 1, 2011.

* cited by examiner

*Primary Examiner* — Dean O Takaoka
*Assistant Examiner* — Alan Wong
(74) *Attorney, Agent, or Firm* — Harrington & Smith

(57) ABSTRACT

In one or more embodiments described herein, there is provided an apparatus comprising input and output waveguides, and a carbon nanotube array. The array is positioned to electromagnetically couple the waveguides. The array has a slow-wave factor associated therewith, the speed of propagation of waves through the array being determined by this slow-wave factor. The array also has a first interface region. The apparatus further comprises a tuning element positioned to oppose the first interface region of the array to define a tuning distance. The slow-wave factor is affected by this tuning distance, and the tuning element is configured to be movable with respect to the first interface region so as to vary this tuning distance and thereby control the speed of propagation of waves through the array.

13 Claims, 4 Drawing Sheets

Fig. 6

APPARATUS AND ASSOCIATED METHODS

TECHNICAL FIELD

The present disclosure relates to the field of carbon nanotube arrays in combination with electromagnetic waveguides, associated methods, computer programs and related apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Recently, the use of electromagnetic waves in the millimeter and sub-millimeter wave length range for communication purposes has attracted a lot of attention. Advantages associated with using such electromagnetic waves/radiation are numerous, such as improved bandwidth and therefore higher transmission rates are possible (compared to microwave communications). Furthermore, indoor wireless communications in the THz (Terahertz) frequency band(s) may be able to provide data channels that have a data capacity of Tera-bits per second.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
an input waveguide;
an output waveguide;
a carbon nanotube array positioned to electromagnetically couple the input and output waveguides, the array having a slow-wave factor associated therewith, wherein the speed of propagation of waves through the array is determined by the slow-wave factor of the array, the array also having a first interface region; and
a tuning element positioned to oppose the first interface region to define a tuning distance therebetween, wherein the slow-wave factor is affected by this tuning distance, the tuning element being configured to be movable with respect to the first interface region so as to vary the tuning distance and thereby control the speed of propagation of waves through the array.

The apparatus may be configured so as to couple the waveguides to the carbon nanotube array such that the electrical polarisation of received electromagnetic waves lies in the plane of the nanotubes of the array.

The carbon nanotube array may be dimensioned so as to be electrically resonant for the electromagnetic waves to be received by the apparatus.

The carbon nanotubes of the array may be dimensioned to be the same length as pi ($\pi$) divided by the in-use wave number of the electromagnetic waves in the z direction to provide electrical resonance of the array.

The wave number $\beta$ in the z direction and the wave number $\gamma$ of the wave in the array may be governed by the following equation:

$$\frac{\beta}{k}\tan(\beta L) + \frac{\sqrt{k^2 - \gamma^2}}{k}\tan(\sqrt{k^2 - \gamma^2}\,\delta) = 0$$

Where $\gamma$ is wave number of the slow-wave in the array; k is the wave number of the wave travelling through the array as if it were travelling through free space; and $\delta$ is the tuning distance defined between the first interface region of the array and the tuning element.

The array may also have a second interface region, and the apparatus may comprise an electrode positioned to ground the second interface region of the array.

The carbon nanotube array may have a lower EM wave propagation velocity than EM waves in a vacuum/free space The tuning element may be configured to be able to vary the magnitude of the electric field.

The tuning element may comprise a control element, and a displacement element positioned between the control element and the array, wherein the displacement element is configured to be able to control the displacement between the control element and the array to thereby modify the tuning distance.

The displacement element may be a piezo electric element.
The control element may be conductive. For example, the control element may be a metal plate.

The electrode may be a metal plate.

The control element may also be non-conductive, and may be formed from a dielectric. The control element may also be a semiconductor, or formed from a semiconductor material.

The array may be positioned to be offset to respective main faces of input and output waveguides.

The array may be positioned so as to be electromagnetically coupled with axial interface regions (e.g. end-on face regions) of the input and output waveguides.

The array may be positioned so as to be electromagnetically coupled with radial interface regions (e.g. lateral/side regions) of the input and output waveguides.

In another aspect, there is provided an apparatus comprising:
means for inputting electromagnetic waves;
means for outputting electromagnetic waves;
means for coupling the means for inputting and means for outputting, the means for coupling being positioned to electromagnetically couple the input and output waveguides, the means for coupling having a slow-wave factor associated therewith, wherein the speed of propagation of waves through the means for coupling is determined by the slow-wave factor of the means for coupling, the means for coupling also having a first interface region; and
means for tuning positioned to oppose the first interface region to define a tuning distance therebetween, wherein the slow-wave factor is affected by this tuning distance, the means for tuning being configured to be movable with respect to the first interface region so as to vary the tuning distance and thereby control the speed of propagation of waves through the means for coupling.

In another aspect, there is provided a method of assembling an apparatus, the method comprising:

positioning a carbon nanotube array to electromagnetically couple an input waveguide and an output waveguide, the array having a slow-wave factor associated therewith, wherein the speed of propagation of waves through the array is determined by the slow-wave factor of the array, the array also having a first interface region; and positioning the tuning element to oppose the first interface region of the array to define a tuning distance therebetween, wherein the slow-wave factor is affected by this tuning distance, the tuning element being configured to be movable with respect to the first interface region so as to vary the tuning distance and thereby control the speed of propagation of waves through the array.

In another aspect, there is provided a method comprising:

delaying electromagnetic waves in an apparatus comprising a carbon nanotube array by moving a tuning element with respect to a first interface region of the carbon nanotube array so as to vary the tuning distance and thereby control the speed of propagation of waves through the array comprising a carbon nanotube array, wherein, in the apparatus, the carbon nanotube array is positioned to electromagnetically couple an input waveguide and an output waveguide, the array having a slow-wave factor associated therewith, wherein the speed of propagation of waves through the array is determined by the slow-wave factor of the array, the array also having a first interface region; and the tuning element is positioned to oppose the first interface region to define a tuning distance therebetween, wherein the slow-wave factor is affected by this tuning distance, the tuning element being configured to be movable with respect to the first interface region so as to vary the tuning distance and thereby control the speed of propagation of waves through the array.

In another aspect there is provided a non-transitory computer readable medium comprising computer program code stored thereon, the computer program code being configured to, when run on a processor, perform the method of the aspect immediately above.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

DESCRIPTION OF EXAMPLE ASPECTS/EMBODIMENTS

In one or more embodiments described herein, there is provided an apparatus comprising an input waveguide, an output waveguide and a carbon nanotube array. The array is positioned to electromagnetically couple the input and output waveguides. The array has a slow-wave factor associated therewith, wherein the speed of propagation of waves through the array is determined by the slow-wave factor of the array. The array also has a first interface region.

The apparatus further comprises a tuning element positioned to oppose the first interface region of the array to define a tuning distance between the tuning element and the first interface region of the array. The slow-wave factor is affected by this tuning distance, and the tuning element is configured to be movable with respect to the first interface region so as to vary this tuning distance and thereby control the speed of propagation of waves through the array.

By configuring the array in this way, and by positioning the array between an input and output waveguide, it is possible to introduce a time delay into the propagation of electromagnetic waves between the two waveguides. The array's slow-wave factor affects how quickly/slowly waves propagate through the array, and by varying this it is possible to decrease/increase a delay time relative to a previous state of the array. This can allow for increased control and flexibility over electromagnetic wave signal propagation through devices that utilise such signals. Due to the nano-scale size of carbon nanotubes and arrays formed from nanotubes, this apparatus can be made to be very small relative to other delay-line components known in the art.

Figure 1:
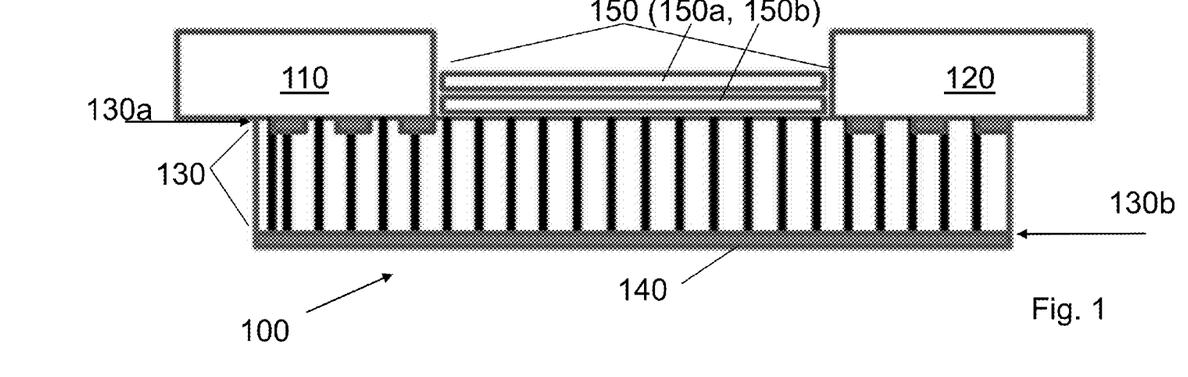
FIG. 1 illustrates an apparatus of a first embodiment according to the present disclosure.

We will now describe a first embodiment with reference to FIG. 1.

The apparatus 100 shown in FIG. 1 comprises an input waveguide 110, an output waveguide 120, a carbon nanotube array 130, an electrode 140, and a tuning element 150.

The input waveguide 110 and output waveguide 120 are, in this embodiment, dielectric waveguides formed from doped silicon wafers. In other embodiments the waveguides are formed from alternative dielectric materials or even metallic materials. The input waveguide 110 allows for receiving electromagnetic waves from a source, and the output waveguides allows for onward provision of electromagnetic waves from the input waveguide 120.

The formation of the waveguides 110, 120 allows for propagation of electromagnetic waves through the input and output waveguides 110, 120. For example, the waveguides 110, 120 can be formed to allow for propagation of electromagnetic waves over the millimeter or sub-millimeter wavelength range.

In this embodiment, the waveguides 110, 120 have radial input/output interface regions that allow for electromagnetic waves to enter/exit the waveguides 110, 120. These radial interface regions are on the side of the waveguides 110, 120

(i.e. lateral regions), though in other embodiments they may be end-on interface regions (e.g. axial interface regions), or some combination of the two.

The carbon nanotube array 130 is formed from a plurality of carbon nanotubes (may be any number ranging from 2 upwards, for example, into the hundreds, thousands, or even millions). The array 130, by virtue of its dimensions and by virtue of the configuration of the nanotubes in the array 130, will have a slow-wave factor associated with it.

The slow-wave factor is a property of the array that controls the speed of wave propagation within the array. The term 'slow-wave factor' refers to a co-efficient that indicates how much slower than the speed of light electromagnetic waves travel through a given volume/medium. Vacuum/free space has a slow-wave factor of 1, which means that electromagnetic waves travel at the speed of light, c. All mediums other than vacuum/free space have a lower slow-wave factor than vacuum/free space that means electromagnetic waves travel slower than the speed of light within those mediums. This is the case in the carbon nanotube array 130. The difference is, the slow-wave factor of the nanotube array 130 is not necessarily fixed and can be changed or varied. This is a property that is very particular to the carbon nanotube array.

The nanotubes in the array 130 are dimensioned to be of a particular length (L), and a particular number of nanotubes are positioned within the array to have of a particular spacing/periodicity. This configuration of the nanotubes and the array 130 itself is governed by the specific range of frequencies/wavelengths of the electromagnetic waves to be received by the apparatus 100. In particular, the array 130 is dimensioned so as to be electrically resonant along its length for a range of frequencies of electromagnetic waves. This aspect of the array 130 is explained in detail below.

The nanotube array has a first interface region 130a. In this embodiment the array also has a second interface region 130b. In FIG. 1 as illustrated, the first interface region 130a is the top-most surface of the array 130 and the second interface region 130b is the bottom-most surface of the array 130. It will be appreciated that these 'top' and 'bottom' references are only used to aid clarity in describing this embodiment depicted in FIG. 1, and that the exact orientation of these interface regions 130a, 130b relative to one another may be different in other embodiments.

In this embodiment, the electrode 140 is a metal plate. This is dimensioned to match the surface area of the second interface region 130b of the array 130 so that it can be positioned to exactly cover this interface region 130b and thereby ground the second interface region 130b. In this embodiment the electrode 140 is used to ground the array 130, however there are also other embodiments in which no grounding electrode is used, or more than one other electrode is used to ground the array 130 (these embodiments are not shown).

The tuning element 150 comprises a control element 150a and a displacement element 150b. The control element in this embodiment is conductive and is a metal plate. However, in other embodiments the control element is instead formed from a dielectric (i.e. insulative/non-conducting) or semiconductor material. The displacement element in this embodiment is a piezoelectric actuator. The displacement element is provided on one side of the control element so that when the tuning element 150 is positioned with the first interface region 130a of the array 130, the displacement element is positioned between the first interface region 130a of the array 130 and the control element 150.

The control element 150a acts as a 'bound' to the electromagnetic waves travelling through the array 130. By moving this bound, the boundary conditions imposed on the electromagnetic wave change and the speed of propagation of the wave through the array 130 therefore also changes. The displacement element 150b is able to move the control element closer to or further away from the first interface region 130a of the array 130 to thereby alter the distance between the control element 150a and the first interface region 130a. This distance between the control element 150a and the first interface region 130a is defined as a tuning distance and affects the slow-wave factor of the array.

The tuning element 150 is smaller in surface area than the first interface region 130a of the array 130. The tuning element 150 is shorter in length than the total length of the array 130 so as to expose an input and output region on the upper-most surface. These regions allow for electromagnetic coupling of the input and output waveguides 110, 120 (respectively) to the array 130.

We will now describe the assembly of this apparatus.

The array 130 is first formed from a number of carbon nanotubes.

The electrode 140 is affixed to the second interface region of the array. The tuning element 150 is affixed to the first interface region of the array 130 so as to place the displacement element 150b between the first interface region 130a and the control element 150a of the tuning element 150a. The tuning element 150 is affixed in such a way so as to leave an input region exposed on the upper-most surface of the array 130 and an output region exposed on the upper-most surface of the array 130. The radial input/output regions of the respective input and output waveguides 110, 120 are then respectively coupled to these regions so as to electromagnetically couple the waveguides 110, 120 to the array 130. These radial input/output regions are regions located on the outer side surface(s) of the input/output waveguides 110/120, and not the end or axial faces of the waveguides 110/120 (at least in this embodiment).

We will now describe the operation of this apparatus 100.

Input electromagnetic wave signalling across a range of frequencies is input into the input waveguide 110. This signalling propagates to the output end of the input waveguide 110 coupled to the array 130. The array 130 receives the electromagnetic wave signal from the input waveguide 110.

The electrode 140 and the control element 150 affect the boundary conditions of the electromagnetic waves passing through the array, and have a direct effect on the speed of propagation of the waves through the array. The electrode 140 position is fixed relative to the array 130, but the control element 150a of the tuning element 150 is not. The displacement element 150b is able to expand/contract to modify the distance (the tuning distance) between the first interface region 130a of the array 130 and the control element 150a of the tuning element 150. This therefore allows for variation in the boundary condition provided by the tuning element 150, and consequently affects the slow-wave factor of the array 130.

By causing the displacement element to contract (e.g. in the case of a piezoelectric actuator) the control element 150a is moved closer to the array 130 and also to the electrode 140 on the other side of the array. By expanding the displacement element 150b the opposite effect occurs. Again, this affects the boundary conditions of the array/apparatus and consequently the speed of propagation of the waves within the array.

Boundary conditions and their effect on electromagnetic waves propagating in such systems are well understood by those skilled in the art and will not be discussed in detail.

As the wave moves through the array at a speed dependent on the tuning distance, a variable time delay can be introduced into the signal/electromagnetic wave depending on the configuration of the apparatus 100. The output waveguide 120 will receive the electromagnetic wave some time after the electromagnetic wave entered the array that is different than if the array were simply made of the same medium/material as the waveguides 110, 120 themselves. This can be useful in controlling how electromagnetic waves travel through devices.

Figure 3:
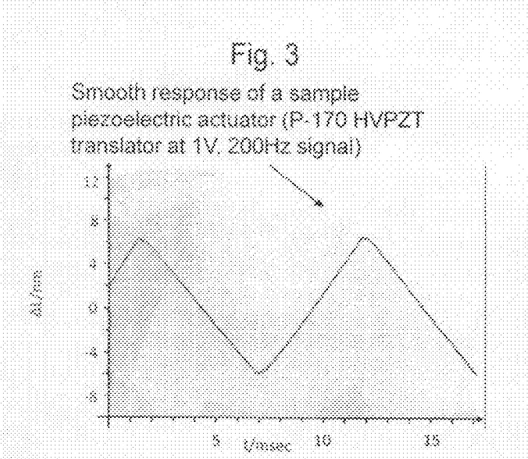
FIG. 3 illustrates how tuning distance is varied in one or more embodiments.

Finely controlled variation of the tuning distance and, therefore, finely controlled change in the slow-wave factor can be achieved by using a piezoelectric actuator for the displacement element 150b. FIG. 3 illustrates how the displacement or offset that can be achieved by a piezoelectric actuator can be accurate to within nanometers. The exact displacement achieved by the displacement element 150b of the tuning element 150 can be controlled to introduce a desired delay time into the apparatus 100. For example, a processor or remote electronic device can be configured to monitor the delay time of an electromagnetic wave signal passing through the apparatus, and to be able to change the slow-wave factor by moving the tuning element to vary the tuning distance.

In order for the tuning distance to optimally affect the slow-wave factor of the waves travelling through the array 130, the array 130 should be configured and dimensioned to meet certain conditions:

(1) Electrical resonance—The array 130 should be dimensioned so as to be electrically resonant along its length for the electromagnetic waves to be received and to be passed through the array; and
(2) Electrical polarisation—The array 130 should be configured with the apparatus 100 so that the electromagnetic waves to be received propagate through the array 130 such that they are electrically polarized in the plane of the carbon nanotubes in the array 130.

At least some of the carbon nanotubes in the array should also possess metallic properties.

Electrical resonance occurs in an electric circuit at particular frequencies where the impedance between the input and output of the circuit is at a minimum (or when the transfer function is at a maximum). Often this happens when the impedance between the input and output of the circuit is almost zero and when the transfer function is close to one. The resonance of the array is therefore dependent on the dimensions of the nanotubes and the array 130 as a whole.

In the simplest case, when the array 130 is placed between two metal plates (such as the control element 150a and the electrode 140) the resonance condition is:

$$\beta L = \pi, \quad (1)$$

$\beta$=wave number of electromagnetic wave in z direction; and
L=length of individual nanotubes (in z direction).

On the face of it, this equation would indicate that a given frequency of electromagnetic wave would require a specific length and physical configuration of the carbon nanotube array. This would certainly be the case if the nanotubes were in fact just conducting wires. However, due to the inherent properties of the nanotubes and the complexity of the $\beta$ component, the arrangement of the apparatus actually results in a wide band/range of frequencies being able to satisfy the resonance condition.

The wave number ($\beta$) depends on the diameter of nanotube, their spacing/periodicity in the array and the wave number $\gamma$. Physically, this dependence is related to two quantum properties of the nanotubes:

(i) The surface conductivity of the metallic nanotubes—
The carbon nanotubes have an inductive character (quantum inductance) due to the large quantum inductance exhibited by metallic nanotubes; and
(ii) The electromagnetic interaction between nanotubes.

The connection between the wave number in the plane of the array ($\beta$) and the wave number of that same wave in free space is expressed by:

$$\beta^2 = \frac{k^2(k^2 - \gamma^2 - k_p^2)}{k^2 - k_p^2} \quad (2)$$

k=the wave number of the same wave in free space, k=w/c, c is the speed of light,
$k_p$=effective plasma frequency.

This equation takes into account both quantum properties of the carbon nanotubes (as above) as well as their electromagnetic interaction.

It follows from equation (1) that the resonant condition can be satisfied not only at a fixed constant frequency or corresponding k (or harmonics/sub-harmonics thereof) but that actually a range of frequencies will satisfy the necessary conditions to achieve resonance. Namely, for a fixed L (as per equation (1)), it is possible to achieve the slow-wave effect for a wide band of frequencies. This is illustrated in FIG. 4c.

This wave number $\beta$ is a longitudinal wave number (longitudinal being defined relative to the nanotubes) and is typically calculated numerically. For example, this can be done using the cylindrical model of impedance. This model takes into account quantum properties of carbon nanotubes, in particular it accounts for the quantum dynamic surface conductivity and electromagnetic interaction between carbon nanotubes mentioned above via periodic Green's functions.

Figure 4A:
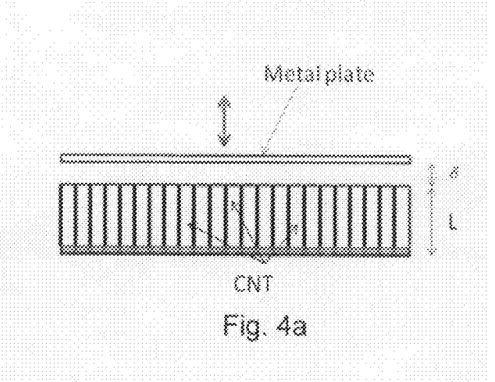
FIG. 4a illustrates a carbon nanotube array of one or more embodiments.
Figure 4B:
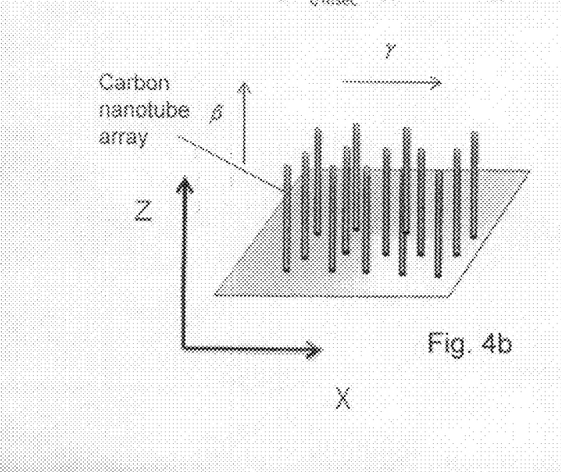
FIG. 4b illustrates how carbon nanotube arrays are configured for one or more embodiments.
Figure 4C:
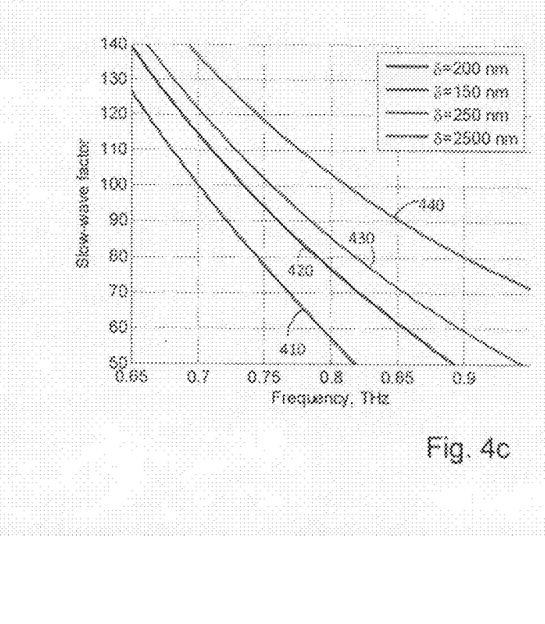
FIG. 4c illustrates variation of speed of wave propagation in a carbon nanotube array in one or more embodiments.

We shall now discuss propagation of electromagnetic wave in the structure shown in FIG. 4a (in essence the apparatus 100 of FIG. 1 minus the input and output waveguides 110, 120). The bottom-most interface is grounded and the top metal plate (representative of the control element 150a) can be moved from the upper-most interface of the array to the distance $\delta$. In this case parameters of wave can be found from the transcendent equation $$\frac{\beta}{k}\tan(\beta L) + \frac{\sqrt{k^2 - \gamma^2}}{k}\tan(\sqrt{k^2 - \gamma^2}\,\delta) = 0 \quad (3)$$

Where $\gamma$ is wave number of slow electromagnetic wave in the x direction, k is the wave number in free space, and $\delta$ is the tuning distance between nanotubes and a top plate. FIG. 4b illustrates how some of these properties are physically related to the nanotube array 130 itself.

Equation (3) makes it possible to numerically calculate $\gamma(\omega)$, i.e. $\gamma$ as a function of $\omega$. For example, FIG. 4c shows how the velocity of EM wave propagation varies in the carbon nanotube array with the following parameters:
(i) nanotubes length 6 μm;
(ii) diameter 30 nm; and
(iii) period 150 nm.

This figure illustrates the relationship between slow-wave factors for electromagnetic waves of given frequencies and the tuning distance ($\delta$) between the array 130 and the tuning element 150. In FIG. 4c, the tuning distance $\delta$ at 150 nm is indicated by reference number 410, the tuning distance $\delta$ at 200 nm is indicated by reference number 420, the tuning distance $\delta$ at 250 nm is indicated by reference number 430, and the tuning distance $\delta$ at 2500 nm is indicated by reference number 440. It can be seen for example, that if the tuning distance varies from 150 nm to 2500 nm at frequency 750 GHz, the slow-wave factor changes from 80 to 120. Thus there is a corresponding variation in delay time of 50%.

Figure 2:
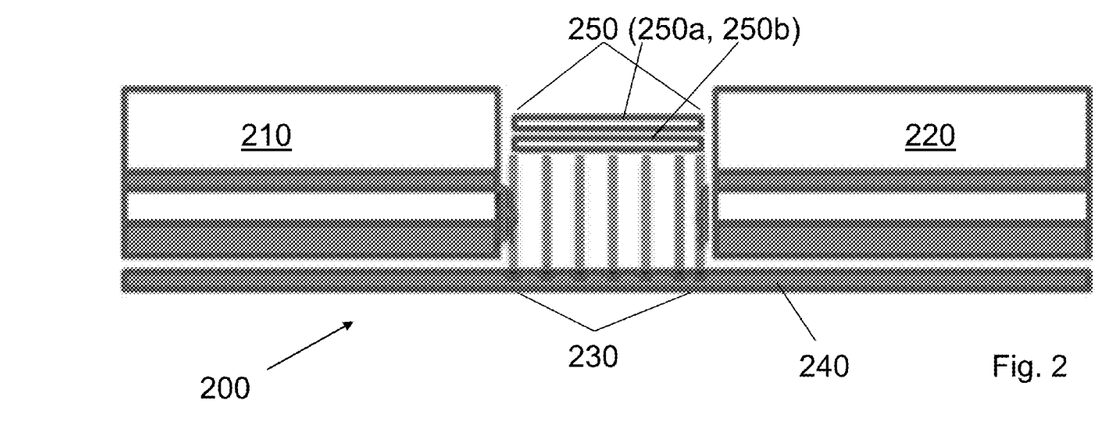
FIG. 2 illustrates a variation of the first embodiment.

FIG. 2 illustrates another embodiment of an apparatus 200 based on the embodiment of FIG. 1. The apparatus 200 includes an electrode 240 and a tuning element 250 comprising a control element 250a and a displacement element 250b. Essentially, this operates in exactly the same way as the apparatus of FIG. 1 except that the array 230 is positioned so as to be electromagnetically coupled to the axial output regions of the input and output waveguides 210, 220 (or, in other words, the end faces of the respective waveguides 210, 220) as opposed to the radial output regions of the input and output waveguides 210, 220 as in the first embodiment. This can allow for a slightly more compact arrangement than the first embodiment as the array is not offset relative to the waveguides as per apparatus 100.

Figure 5:
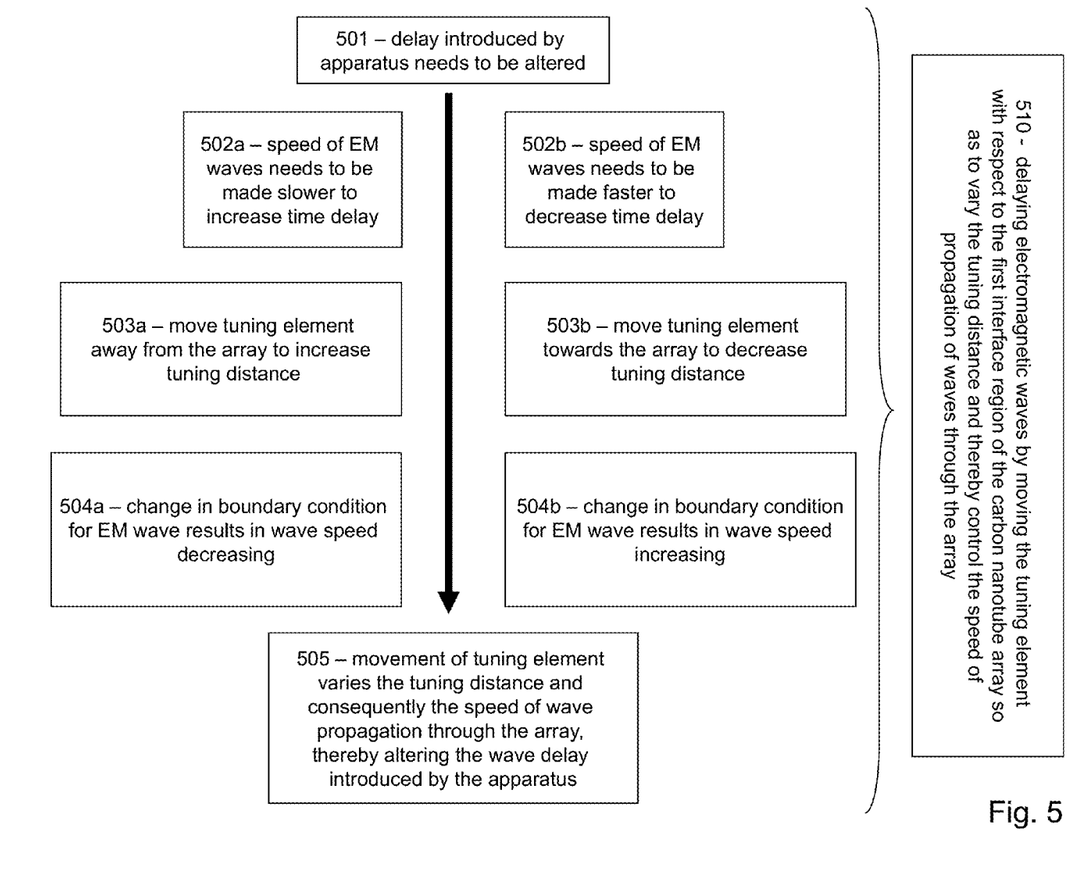
FIG. 5 illustrates method of operation of one or more embodiments.

In FIG. 5 there is provided a method for delaying electromagnetic waves in the apparatus of FIG. 1. The method comprises:

510—delaying electromagnetic waves in an apparatus comprising a carbon nanotube array (e.g. as per one of the embodiments described above) by moving a tuning element with respect to a first interface region of the carbon nanotube array so as to vary the tuning distance and thereby control the speed of propagation of waves through the array.

Also shown in FIG. 5 are more detailed sub-steps involved in varying the slow-wave factor so as to increase or decrease speed of propagation of waves through the array as described above. In sub-step 501, a delay introduced by the apparatus is altered such that in sub-step 506, movement of the tuning element varies the tuning distance and consequently the speed of wave propagation through the array, thereby altering the wave delay introduced by the apparatus. In proceeding from sub-step 501 to sub-step 505, various other sub-steps are carried out. In particular, in sub-step 502a, the speed of EM waves is made slower to increase the time delay, and/or in sub-step 502b, the speed of EM waves is made faster to decrease the time delay. Furthermore, in sub-step 503a, the tuning element is moved away from the array to increase the tuning distance, and/or in sub-step 503b, the tuning element is moved towards the array to decrease the tuning distance. Moreover, in sub-step 504a, a change in the boundary condition for the EM wave results in the wave speed decreasing, and/or in sub-step 504b, a change in the boundary condition for the EM wave results in the wave speed increasing.

Figure 6:
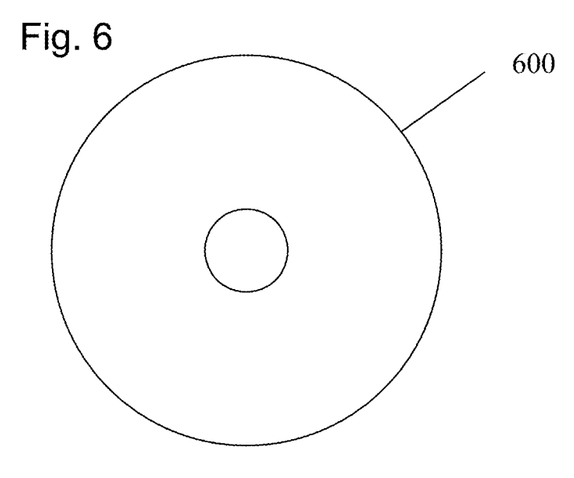
FIG. 6 illustrates schematically a computer readable media providing a program according to an embodiment of the present disclosure.

FIG. 6 illustrates schematically a computer/processor readable media 600 providing a program according to an embodiment of the present invention. For example, the program can monitor and control variation in the tuning distance of the apparatus and, therefore, the slow-wave factor of the apparatus. In this example, the computer/processor readable media is a disc such as a digital versatile disc (DVD) or a compact disc (CD). In other embodiments, the computer readable media may be any media that has been programmed in such a way as to carry out an inventive function. This may provide an automated or semi-automated feedback method for varying the tuning distance of the apparatus of one or more embodiments described above so as to introduce a desired delay time into a propagating wave signal.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/elements/processor may have other functions in addition to the mentioned functions, and that these functions may be performed by the same apparatus/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
an input waveguide;
an output waveguide;
a carbon nanotube array positioned to electromagnetically couple the input and output waveguides, the array having a slow-wave factor associated therewith, wherein the speed of propagation of electromagnetic waves through the array is determined by the slow-wave factor of the array, the array also having a first interface region; and
a tuning element positioned to oppose the first interface region to define a tuning distance therebetween, wherein the slow-wave factor is affected by this tuning distance, the tuning element being configured to be movable with respect to the first interface region so as to vary the tuning distance and thereby control the speed of propagation of electromagnetic waves through the array;
wherein the tuning element comprises a control element, and a displacement element positioned between the control element and the array, wherein the displacement element is configured to be able to control the displacement between the control element and the array to thereby modify the tuning distance.

2. The apparatus as claimed in claim 1, wherein the apparatus is configured so as to couple the waveguides to the carbon nanotube array such that the electrical polarisation of received electromagnetic waves lie in the plane of the nanotubes of the array.

3. The apparatus as claimed in claim 1, wherein the carbon nanotube array is dimensioned so as to be electrically resonant for the electromagnetic waves to be received by the apparatus.

4. The apparatus as claimed in claim 3, wherein the carbon nanotubes of the array are dimensioned to be the same length as pi divided by a wave number of the electromagnetic waves in a z direction to provide electrical resonance of the array.

5. The apparatus as claimed in claim 4, wherein the wave number of the electromagnetic waves in the z direction and the wave number of the wave in the array is governed by the following equation:

$$\frac{\beta}{k}\tan(\beta L) + \frac{\sqrt{k^2-\gamma^2}}{k}\tan(\sqrt{k^2-\gamma^2}\,\delta) = 0$$

where $\beta$=the wave number of the electromagnetic waves in the z direction; k=a wave number in free space; L=a length of the carbon nanotubes in the array; $\gamma$=the wave number of wave in the array; and $\delta$=the tuning distance.

6. The apparatus as claimed in claim 1, wherein the array also has a second interface region, and the apparatus comprises an electrode positioned to ground the second interface region of the array.

7. The apparatus as claimed in claim 1, wherein the carbon nanotube array has a lower electromagnetic wave propagation velocity than electromagnetic waves in a vacuum/free space.

8. The apparatus as claimed in claim 1, wherein the tuning element is configured to be able to vary the magnitude of the electric field.

9. The apparatus as claimed in claim 1, wherein the array is positioned so as to be electromagnetically coupled with axial interface regions of the input and output waveguides.

10. The apparatus as claimed in claim 1, wherein the array is positioned so as to be electromagnetically coupled with radial interface regions of the input and output waveguides.

11. A method of assembling an apparatus, the method comprising:
positioning a carbon nanotube array to electromagnetically couple an input waveguide and an output waveguide, the array having a slow-wave factor associated therewith, wherein the speed of propagation of waves through the array is determined by the slow-wave factor of the array, the array also having a first interface region;
positioning a tuning element having a displacement element and a control element, the displacement element being positioned to oppose the first interface region of the array to define a tuning distance therebetween, wherein the slow-wave factor is affected by this tuning distance, the displacement element being configured to be movable with respect to the first interface region so as to vary the tuning distance and thereby control the speed of propagation of waves through the array.

12. A method comprising:
delaying electromagnetic waves in an apparatus comprising a carbon nanotube array by moving a displacement element of a tuning element with respect to a first interface region of the carbon nanotube array and further with respect to a control element of the tuning element, the displacement element being located between the carbon nanotube array and the control element, so as to vary a tuning distance and thereby control the speed of propagation of waves through the array comprising a carbon nanotube array,
wherein, in the apparatus, the carbon nanotube array is positioned to electromagnetically couple an input waveguide and an output waveguide, the array having a slow-wave factor associated therewith, wherein the speed of propagation of waves through the array is determined by the slow-wave factor of the array, the array also having a first interface region; and
the tuning element is positioned to oppose the first interface region to define a tuning distance therebetween, wherein the slow-wave factor is affected by this tuning distance, the tuning element being configured to be movable with respect to the first interface region so as to vary the tuning distance and thereby control the speed of propagation of waves through the array.

13. A non-transitory computer readable medium comprising computer program code stored thereon, the computer program code being configured to, when run on a processor, perform the method of claim 12.

* * * * *